O. H. & K. WEBER.
PROCESS AND FURNACE FOR PRODUCING GAS REACTIONS.
APPLICATION FILED JUNE 7, 1912.
1,042,179.
Patented Oct. 22, 1912.
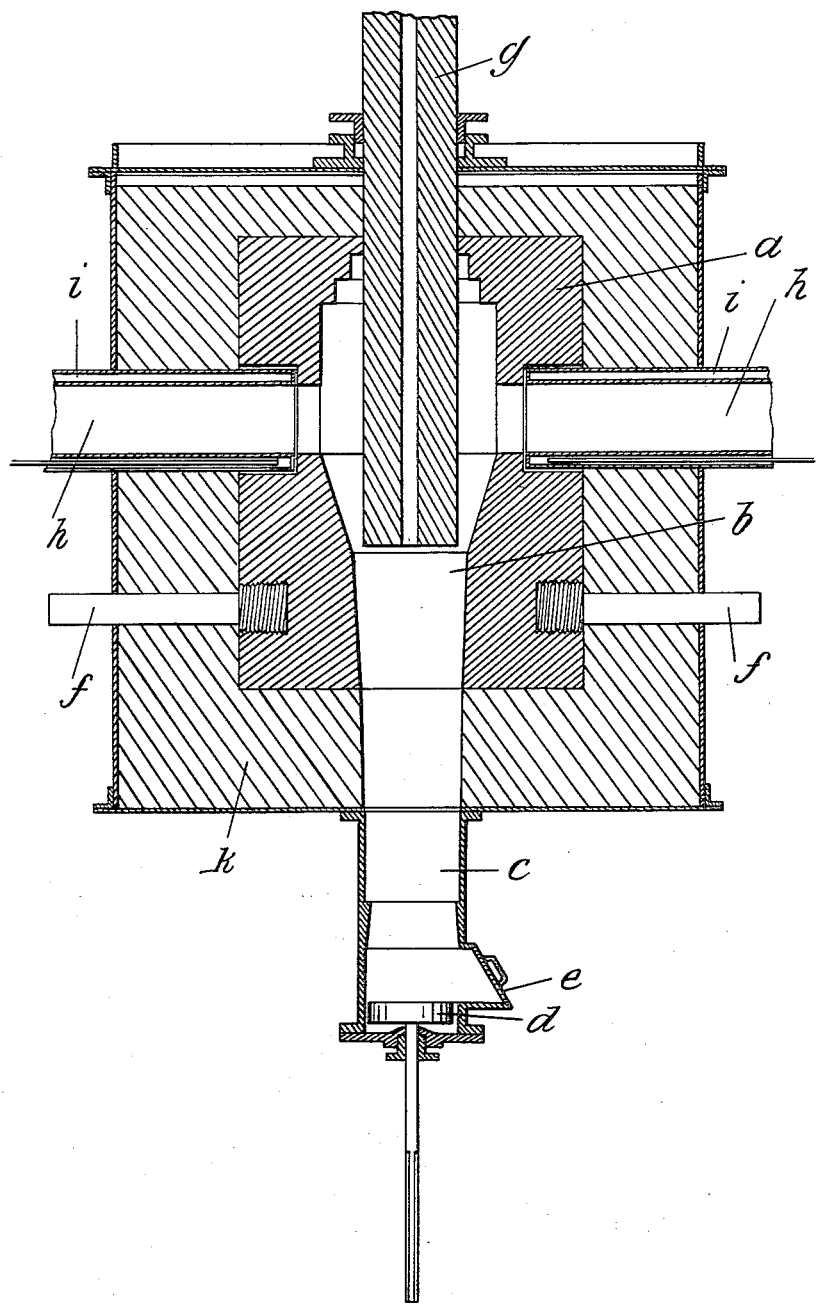
WITNESSES:
INVENTORS
Oskar Hermann Weber
Karl Weber
BY
ATTORNEYS

UNITED STATES PATENT OFFICE.

OSKAR HERMANN WEBER AND KARL WEBER, OF GRIESHEIM, GERMANY, ASSIGNORS TO CORPORATION OF CHEMISCHE FABRIK GRIESHEIM ELEKTRON, OF FRANKFORT-ON-THE-MAIN, GERMANY, AND OTTO DIEFFENBACH AND WILHELM MOLDENHAUER, OF DARMSTADT, GERMANY.

PROCESS AND FURNACE FOR PRODUCING GAS REACTIONS.

1,042,179.      Specification of Letters Patent.      Patented Oct. 22, 1912.

Application filed June 7, 1912. Serial No. 702,188.

*To all whom it may concern:*

Be it known that we, OSKAR HERMANN WEBER and KARL WEBER, citizens of the German Empire, and residents of Griesheim-on-the-Main, Germany, have invented new and useful Improvements in Processes and Furnaces for Producing Gas Reactions, of which the following is a specification.

In United States Letters Patent No. 941,768 dated Nov. 30, 1909, there are described a process and a furnace, particularly applicable for producing hydrocyanic acid in the electric arc. The practice of this process has shown that the renewal of the consumed electrode, which especially characterizes this process and consists of a heap of carbon (coke, coal or the like) cannot be effected sufficiently uniformly in the manner prescribed in the said patent. On the one hand hollow spaces may easily be produced in the heap in the neighborhood of the electrode, and on the other hand when material is added it may easily happen that by poking, the coke walls may be caused to fall in toward the electrode so that the strength of the current passing through the furnace fluctuates between very considerable limits and the control of the load of the furnace is impossible without resistances absorbing energy.

According to the present invention, the material which constitutes both the electrode and the carbon to be consumed is fed to the hearth of the furnace from below. Experiments have shown that in this manner it is possible to feed the carbon that is to be consumed very satisfactorily because the feed is uniform and gives rise to comparatively unimportant fluctuations in the current. Besides this improvement, which is particularly important for the power producing part of the installation, there is the equally valuable commercial result in the matter of consumption of the raw material, namely that by this mode of feeding and the detailed arrangement there is a sharp limitation of the zone of reaction and therefore a uniform consumption of the uniformly supplied raw material, the latter being preheated by radiation and conduction. This feeding of the carbon from below introduces certain difficulties in supplying the gaseous mixture also from below, as has been the custom in the processes previously known. This has led to the introduction of the gases from above through the hollow electrode, which was used in the aforesaid patent for removing the products of reaction. Unexpected advantages accrue from this. In the first instance the products of reaction now gain access to the flue in a broad current on the outer side of the carbon crater, and can escape directly through wide, radial and cooled draw-off pipes. In this manner they are immediately brought into contact with a large cooling surface, whereas in the construction according to the aforesaid patent there is a rapid thin current through the hollow electrode which can be cooled only after it has left the latter. The immediate powerful cooling is of the greatest importance. Furthermore the reaction in the electric arc proceeds more advantageously as will be seen from the following considerations. In consequence of the great uniformity of the consumption the heat is more uniform, the strong downwardly directed current of the gases strikes the heap of carbon at high speed, penetrates into the interstices between the glowing carbon particles and thus reaches a very high temperature in the most highly heated zone of the carbon heap.

The invention relates also to a further improvement of the process described in the aforesaid patent. In the synthesis of hydrocyanic acid in electric arc furnaces, the operation has always been conducted in accordance with the requirements of the law of mass action with equal volumes of nitrogen and hydrogen, either pure or diluted with other gases. There was an accidental unusually rapid rise in the yield and it was discovered that this was due to the fact that owing to an oversight, the stoechiometrically correct gaseous mixture had not been used, but one containing considerably less hydrogen than the correct volume. It was deduced from this, that, contrary to expectation, the theoretically correct gaseous composition is not practically the best. For example, with a gas mixture containing about 75 to 65 per cent. of nitrogen and 25 to 35 per cent. of hydrogen, there was an increased yield, as compared with the former yield, of about 20 per cent. Seeing that the yield in hydrocyanic acid per unit of energy has always been known to be comparatively small, an increase in yield to the extent of about 20 per cent. is of considerable importance, both in respect of the size of the electrical power installation for producing a given mass of cyanid and for the dimensions of the furnace and the rest of the plant.

In practice the process according to this invention permits of the use of a working gas consisting of, for example, 70 per cent. of nitrogen and 30 per cent. of hydrogen. Correspondingly with the consumption of hydrogen and nitrogen in stoechiometrical proportion, according to the equation

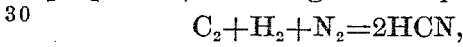
$$C_2+H_2+N_2=2HCN,$$

the working gas must be renewed, however, by addition of the stoechiometrical mixture. Since small proportions of moisture and the presence of variable proportions of hydrocarbons in the other raw material, namely coke or coal, always act to increase the amount of hydrogen, there must always be added for maintaining the proportion of, for example 70 per cent. of nitrogen to 30 per cent. of hydrogen, a mixture containing somewhat more nitrogen than hydrogen or suitable volumes of pure gases. At the same time it was found that there was an essential diminution in the formation of soot which had hitherto been troublesome. It has further been found that it is advantageous previously to dry the gases. By this means is eliminated a corrosion of the hollow supply electrode when using an arc furnace, which corrosion is apparently due to the action of vapor in the gases on the carbon with formation of water gas.

The accompanying drawing illustrates a form of furnace adapted to be used in accordance with this invention. But it may be remarked that the use of the gas mixture last herein described is not essentially necessary in using the improved furnace, the latter mixture being applicable also with the furnace originally described or in any other furnace.

$a$ is a carbon crucible which at its lower part is continued as a slightly conical shaft $b$; the latter is extended outside the crucible by a tube $c$ which expands slightly conically at its lower end where it is provided with a sliding stamp $d$ and a lateral feeding door $e$.

$f$ is the anode conductor and $g$ the cathode.

The tubes $h$ serve for removing the gases and are provided with cooling devices $i$.

$k$ is the furnace covering.

The raw material (coke) which may be made up in the form of packets is pressed up the tube $c$ by the stamp $d$ into the shaft portion of the crucible and finally into the zone of reaction. Owing to the conicity of the shaft the coke is retained firmly at the upper part so that it does not fall when the stamp is withdrawn. Any other known device for uninterruptedly lifting coke and other material in such a shaft may be used. In some cases it is advantageous to mix the coke with an agglutinant which may be used either before the coke is introduced into the shaft for lightly uniting the separate particles or grains, or this union may be brought about by the heat in the shaft. Particularly applicable in this respect is an admixture of caking coal. In this manner the current of gas coming from the arc is prevented from carrying away large pieces with it. It is even possible to use slack in such a furnace, for during its passage up the shaft, it is transformed into a more or less homogeneous porous column of coke.

Now what we claim and desire to secure by Letters Patent is the following;

1. A process for producing gas reactions, which process consists in forming an electric arc between an upper electrode and a lower one, the latter being composed of a charge of fragmentary carbon, which is continuously pushed upward, and feeding gases to said arc, substantially as described.

2. A process for producing gas reactions, which process consists in forming an electric arc between an upper electrode and a lower one, the latter being composed of a column of fragmentary carbon, which is continuously pushed upward, and feeding gases to said arc, substantially as described.

3. A process for producing gas reactions, which process consists in forming an electric arc between an upper electrode and a lower one, the latter being composed of a column of fragmentary carbon, which is continuously pushed upward in proportion as the carbon is consumed and feeding gases to the said arc, substantially as described.

4. A process for producing gas reactions, which process consists in forming an electric arc between an upper electrode and a lower one, the latter being composed of a column of fragmentary carbon, which is continuously pushed upward in proportion as the carbon is consumed and feeding gases to the said arc through the upper hollow electrode, substantially as described.

5. A process for producing gas reactions, which process consists in forming an electric arc between an upper electrode and a lower one, the latter being composed of a column of fragmentary carbon, which is continuously pushed upward in proportion as the carbon is consumed, feeding gases to the said arc through the upper hollow electrode and withdrawing the gaseous products of the reaction immediately behind the reaction zone, substantially as described.

6. A process for producing gas reactions, which process consists in forming an electric arc between an upper electrode and a lower one, the latter being composed of a column of fragmentary carbon, which is continuously pushed upward in proportion as the carbon is consumed, feeding gases to the said arc through the upper hollow electrode and withdrawing the gaseous products of the reaction immediately behind the reaction zone by means of cooled conduits, substantially as described.

7. A process for producing gas reactions, which process consists in forming an electric arc between an upper electrode and a lower one, the latter being composed of a column of fragmentary carbon, which is continuously pushed upward in proportion as the carbon is consumed, feeding gases to the said arc through the upper hollow electrode and withdrawing the gaseous products of the reaction immediately behind the reaction zone by means of cooled conduits outside of the upper electrode, substantially as described.

8. A process for producing gas reactions, which process consists in forming an electric arc between an upper electrode and a lower one, the latter being composed of a column of fragmentary carbon, containing an agglutinant, the column being continuously pushed upward and feeding gases to said arc, substantially as described.

9. A process for producing gas reactions, which process consists in feeding in a continuous stream a mixture of hydrogen and nitrogen containing less than 50 per cent. by volume of hydrogen through a hollow carbon electrode into an arc struck between the said electrode and a moving column of fragmentary carbon and maintaining the original proportion of nitrogen to hydrogen in the gaseous mixture, substantially as described.

10. A process for producing gas reactions, which process consists in feeding a mixture of hydrogen and nitrogen containing less than 50 per cent. by volume of hydrogen through a hollow carbon electrode into an arc struck between the said electrode and a moving column of fragmentary carbon and maintaining the original proportion of nitrogen to hydrogen in the gaseous mixture by feeding the gases in a suitable proportion, substantially as described.

11. A process for producing gas reactions, which process consists in feeding a mixture of hydrogen and nitrogen containing about 25-35 per cent. by volume of hydrogen and 65-75 p. c. of nitrogen through a hollow carbon electrode into an arc struck between the said electrode and a moving column of fragmentary carbon and maintaining the original proportion of nitrogen to hydrogen in the gaseous mixture by feeding the gases in a suitable proportion, substantially as described.

12. A process for producing gas reactions, which process consists in feeding a dried mixture of hydrogen and nitrogen containing about 25-35 per cent. by volume of hydrogen and 75 to 65 p. c. of nitrogen through a hollow carbon electrode into an arc struck between the said electrode and a moving column of fragmentary carbon and maintaining the original proportion of nitrogen to hydrogen in the gaseous mixture by feeding the gases in a suitable proportion, substantially as described.

13. An electric arc furnace for producing gas reactions, comprising a carbon crucible, a hollow adjustable carbon electrode extending into the said crucible, conduits disposed above the lower end of the said electrode, a shaft formed as a continuation of the lower part of the crucible and a device within the said shaft adapted to forward material through the shaft into the crucible from below, substantially as described.

14. An electric arc furnace for producing gas reactions, comprising a carbon crucible, a hollow adjustable carbon electrode extending into the said crucible, horizontal conduits, which are cooled and disposed above the lower end of the said electrode, a shaft formed as a continuation of the lower part of the crucible and a device within the said shaft adapted to forward material through the shaft into the crucible from below, substantially as described.

15. An electric arc furnace for producing gas reactions, comprising a carbon crucible, a hollow adjustable carbon electrode extending into the said crucible, horizontal conduits, which are cooled and disposed above the lower end of the said electrode, a tapering shaft formed as a continuation of the lower part of the crucible and a device within the said shaft adapted to forward material through the shaft into the crucible from below, substantially as described.

16. An electric arc furnace for producing gas reactions, comprising a carbon crucible, a hollow adjustable carbon electrode extending into the said crucible, horizontal conduits, which are cooled and disposed above the lower end of the said electrode, a tapering shaft formed as a continuation of the lower part of the crucible and a stamp within the said shaft adapted to forward material through the shaft into the crucible from below, substantially as described.

In testimony, that we claim the foregoing as our invention, we have signed our names in presence of two witnesses, this 24th day of May 1912.

OSKAR HERMANN WEBER.
KARL WEBER.

Witnesses:
    JEAN GRUND,
    CARL GRUND.